Aug. 20, 1963   O. H. HARIU   3,101,380
CONTROL OF HYDROGEN CONCENTRATION IN RECYCLE HYDROGEN STREAMS
IN THE HYDRODEALKYLATION PROCESS
Filed Oct. 31, 1960   5 Sheets-Sheet 1

Fig. 1

INVENTOR.
OSCAR H. HARIU
BY
ATTORNEY

INVENTOR.
OSCAR H. HARIU
ATTORNEY

United States Patent Office 3,101,380
Patented Aug. 20, 1963

3,101,380
CONTROL OF HYDROGEN CONCENTRATION IN RECYCLE HYDROGEN STREAMS IN THE HYDRODEALKYLATION PROCESS
Oscar H. Hariu, Philadelphia, Pa., assignor to The Atlantic Refining Company, Philadelphia, Pa., a corporation of Pennsylvania
Filed Oct. 31, 1960, Ser. No. 66,120
5 Claims. (Cl. 260—672)

This invention relates to a method of controlling the hydrogen concentration in the recycle hydrogen stream in a hydrodealkylation process and, more particularly, the invention relates to a method for controlling the concentration of hydrogen in recycle hydrogen streams in a hydrodealkylation process without purging gas from the hydrogen recycle stream.

A number of hydrodealkylation processes have been developed wherein various high molecular weight hydrocarbon charge stocks containing alkylated aromatics are subjected to elevated temperatures and pressures in the presence of hydrogen and either in the presence or absence of a catalyst to convert the alkylated aromatics into lower molecular weight compounds by dealkylation or, in some reactions by ring splitting followed by dealkylation. A variety of charge stocks have been utilized which contain the alkylated aromatics, for example, petroleum distillate fractions known as virgin or straight-run fractions have been employed, catalytically or thermally reformed fractions, as well as so-called furnace oil fractions derived from the catalytic or thermal cracking of gas oils or aromatic fractions derived from coal tar.

A typical cracked furnace oil fraction boiling between about 300° F. and 650° F. contains a variety of ring compounds such as higher alkylated benzenes, alkylated naphthalenes, tetralins, decalins, indans, and acenaphthenes. When such a fraction is subjected to elevated temperatures and pressures in the presence of hydrogen these compounds are converted by dealkylation, dehydrogenation, and ring splitting reactions into benzene, toluene, other alkylbenzenes such as xylenes and ethylbenzene, together with naphthalene. These reactions may be carried out either in the presence or absence of a catalyst and, by the proper selection of charge stocks and reaction conditions, it is possible to maximize the yield of a desired compound.

Hydrodealkylation processes employ temperatures ranging between 800° F. and 1400° F. and generally from 950° F. to 1350° F., with pressures ranging from about 500 p.s.i. to 5,000 p.s.i. or higher. In the absence of catalysts it is necessary to subject the hydrocarbons to these elevated temperatures and pressures for from one second to 30 minutes whereas if catalysts are employed liquid hourly space velocities ranging between 0.5 and 20.0 volumes of charge per volume of catalyst per hour may be utilized.

Catalysts suitable for hydrodealkylation include metals from group VIII of the periodic table, for example, platinum or nickel, preferably supported on materials such as alumina, silica-alumina, or kieselguhr; metal oxides such as molybdenum oxide and alumina, chromia and alumina and the like, which catalysts may be promoted with small amounts of other oxides, for example, magnesia; or metal compounds such as aluminum silicate or ferric fluoride.

It is necessary in all instances that hydrogen be present since hydrogen is consumed in the hydrodealkylation reaction, however, an excess above the amount consumed is required to prevent coke formation. The amount of hydrogen consumed by the reaction depends to some degree on the particular reaction conditions employed, in general, this amount will range between 1 mole and 6 moles of hydrogen per mole of hydrocarbon converted. The unconsumed hydrogen is separated from the reactor effluent and is usually recycled to the reaction zone to minimize the make-up hydrogen requirements which must be supplied from external sources. Although hydrogen for hydrogen-consuming processes such as hydrodealkylation processes is generally supplied as a by-product from hydrogen-producing processes such as catalytic reforming operations, the hydrogen supply is generally limited and its cost is that of a chemical and not fuel. Accordingly, every effort is made to minimize its loss. For most hydrodealkylation processes the quantity of hydrogen required in the reaction zone to supply that consumed in the reaction and to prevent coke formation ranges between about 2.0 moles and 20.0 moles of hydrogen per mole of hydrocarbon charge; the moles of hydrocarbon charge being based on the average molecular weight of the hydrocarbon charge.

The hydrogen which is recycled to the reaction zone should have a purity of at least about 60 mole percent hydrogen such that there will be a sufficiently high hydrogen partial pressure to provide a substantially coke-free reaction. Preferably, the purity should be about 70 percent and when catalysts are employed a purity of 80 percent or more is very desirable. The hydrodealkylation reaction produces large quantities of methane which normally are separated from the reactor effluent along with the unconsumed hydrogen. Thus, the concentration of methane in the recycle hydrogen stream will build up unless steps are taken to prevent this from occurring. The usual method of preventing impurity buildup in a recycle stream is to purge the stream either intermittently or continuously. Hydrogen, however, as has been stated, is an expensive material and when purged from the recycle stream admixed with methane its value drops to that of fuel. Purging, therefore, adds materially to the operating costs of the process.

A method now has been found, however, whereby the purity of the hydrogen recycle stream may be maintained at any predetermined level without purging gas from the stream.

It is an object of this invention to provide a method for controlling the hydrogen concentration in the recycle stream in a hydrodealkylation process without purging gas from the recycle stream.

It is another object of this invention to provide a method for controlling the concentration of hydrogen in the recycle hydrogen stream in a hydrodealkylation process to a predetermined level without purging the hydrogen recycle stream.

Other objects of this invention will be apparent from the description and the claims that follow.

In accordance with the invention, the cooled effluent from a hydrodealkylation reactor is introduced into a high pressure separator wherein the unconsumed hydrogen is separated from the liquid effluent hydrocarbons in the presence of a liquid hydrocarbon recycle stream to the separation step which recycle hydrocarbon stream is substantially methane-free, i.e. in general, such stream contains not in excess of about one mole percent methane.

Since the liquid hydrocarbon recycle stream is composed of materials formed in the process and does not require chemical change or reaction, it can be utilized at a nominal pumping cost and since it is a recycle stream it is not lost.

For a more complete understanding of the invention, reference should now be made to the drawings wherein:

FIGURE 1 is a diagrammatic flow sheet illustrating schematically certain important features of the invention;

Figure 2:
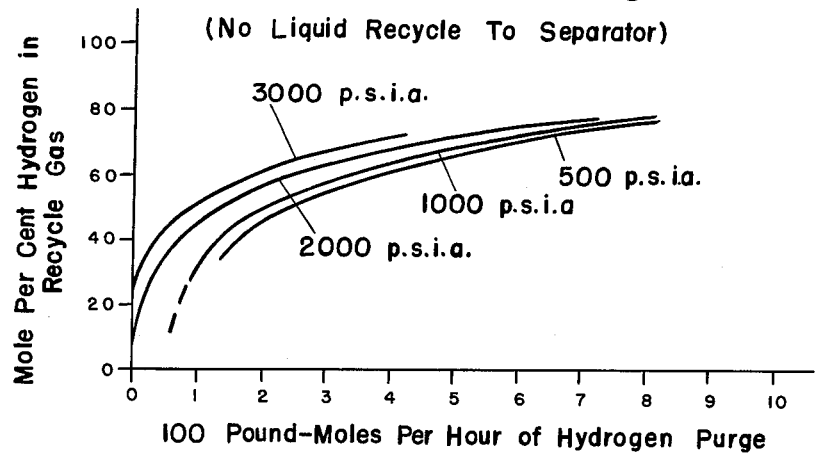
FIGURE 2 is a plot of the mole percent of hydrogen in the hydrogen recycle gas stream versus pound-moles per hour of hydrogen purge for various pressures in the high pressure separator when no liquid hydrocarbon is recycled to the separator.

Referring now to FIGURE 1 of the drawing, numeral 1 designates the charge line through which any one of the hydrodealkylation charge stocks which have been described is introduced into the process. This charge is mixed with make-up hydrogen contained in line 2 and recycle hydrogen in line 3 and sent through line 4 into hydrodealkylation reactor 5. It will be understood that the charge hydrocarbons, together with the hydrogen, are introduced into the reactor at the desired reaction temperature and pressure by the use of suitable and conventional furnaces or heat exchangers and compressors for heating and compressing the hydrocarbons and hydrogen, which equipment is not shown.

The hydrodealkylation reactor 5 may be a conventional reactor wherein the reaction is carried out either solely by thermal reaction in the absence of any catalytic material in the reactor or in the presence of the described hydrodealkylation catalysts. The effluent from the hydrodealkylation reactor is removed through line 6. This effluent, in addition to containing methane and higher molecular weight normally gaseous hydrocarbons, such as ethane, propane, butanes and the like, also will contain the dealkylated aromatics together with unconsumed hydrogen and unreacted hydrocarbons. The effluent from the hydrodealkylation reactor 5 contained in line 6 is admixed with liquid hydrocarbon recycle contained in line 7 and the mixture is introduced through line 8 into high pressure separator 9. The composition and source of the hydrocarbon recycle stream in line 7 will be described hereinafter.

The high pressure separator 9 is operated at a temperature of about 70° F. to 120° F., and preferably at about 100° F. and at a pressure preferably not below about 1000 pounds per square inch for reasons which will be shown hereinafter. The upper limit of pressure which may be utilized in the high pressure separator 9 is that which is useful in the hydrodealkylation process itself, i.e. preferably the pressure should not be in excess of 10,000 p.s.i.a. It will be apparent, of course, that suitable cooling is required between hydrodealkylation reactor 5 and high pressure separator 9, however, such equipment is conventional and therefore is not shown. Since the minimum pressure which it is desired to be utilized in the high pressure separator is 1000 pounds per square inch, it is necessary to utilize a pressure in the hydrodealkylation reactor 5 above that of separator 9 since otherwise there will be required intermediate separation and recompression of the effluent from the hydrodealkylation reactor 5 prior to introducing it into the high pressure separator 9. Since the liquid hydrocarbon recycle contained in line 7 is ordinarily at a pressure lower than 1000 pounds per square inch, it will, of course, be necessary to pump such hydrocarbons to the pressure to be utilized in the high pressure separator 9 and this can be accomplished by conventional equipment not shown.

In the high pressure separator 9 recycle hydrogen is removed overhead through line 3. As will be described, the quantity of methane and other normally gaseous hydrocarbons which are separated along with this hydrogen is controlled by the quantity of liquid hydrocarbon recycle contained in line 7 which is admixed with the hydrodealkylation reactor effluent contained in line 6. It is obvious that if the quantity of the most volatile normally gaseous hydrocarbon, i.e. methane, is controlled in the hydrogen recycle stream, the quantities of the less volatile, higher molecular weight normally gaseous hydrocarbons will automatically be controlled at a lower concentration than the methane. In general, the methane comprises about 80 mole percent of the hydrocarbon impurities in the hydrogen recycle stream. In other words, the mole percent of hydrogen in the recycle stream contained in line 3 is controlled by the quantity of liquid hydrocarbon recycle in line 7.

The bottoms liquid from the high pressure separator 9 is removed through line 10. It contains dissolved hydrogen, all the methane and higher molecular weight normally gaseous hydrocarbons together with the dealkylated aromatics produced in the reaction, unreacted hydrocarbons from the hydrodealkylation reactor, and recycle hydrocarbons. The bottoms liquid from the high pressure separator contained in line 10 is reduced in pressure and raised in temperature by conventional means not shown and introduced into the low pressure separator 11 where it is subjected to a flash separation at a temperature, for example, of from 200° F. to 300° F. and a pressure of from atmospheric to 300 pounds per square inch.

Hydrogen and methane, together with other normally gaseous hydrocarbons, are flashed overhead through line 12 from the low pressure separator 11. The bottoms fraction containing dealkylated aromatic hydrocarbons, unreacted charge hydrocarbons together with the liquid hydrocarbon recycle is removed through line 13. If desired, a portion of this liquid bottoms fraction may be diverted through valve 14, line 15, valve 16, line 17, and valve 18 into line 7 to supply the liquid hydrocarbon recycle to the hydrodealkylation reactor effluent contained in line 6. It will be noted that this liquid hydrocarbon recycle is approximately of the same composition as the composition of the bottoms removed from the high pressure separator 9 except that the concentrations of the dissolved hydrogen, methane, and other normally gaseous hydrocarbons have been substantially reduced. In general, the methane content of such a stream is one mole percent or less and hence is substantially methane-free.

The portion of the bottoms contained in line 13 which is not diverted by valve 14 into line 15 is passed through line 19 into fractionator 20. The overhead gaseous fraction from the low pressure separator is also introduced through line 12 into the fractionator 20 because most of the butanes produced in the reaction will be flashed overhead into line 12 from low pressure separator 11 and it is generally desired to recover these separately.

Fractionator 20 is operated to remove propane and lower boiling materials overhead through line 21 while recovering substantially all of the butanes and heavier hydrocarbons which are removed as a liquid bottoms product through line 22. Instead of using a portion of the liquid bottoms from low pressure separator 11 as a source of liquid hydrocarbon recycle to line 7 and reactor effluent in line 6, a portion of fractionator bottoms in line 22 may be diverted by valve 23 through line 24, valve 16, line 17, valve 18 into line 7. Remaining undiverted product from line 22 is directed through line 25 into subsequent fractionation equipment, not shown, for recovery of the desired individual dealkylated aromatics, such as benzene and naphthalene, and the separation of the recycle streams. The recycle streams comprise the light recycle containing toluene and higher alkylated benzenes and the heavy recycle containing methyl naphthalenes, tetralins, and the like, which, in accordance with conventional practice, are recycled for reprocessing in the hydrodealkylation reactor 5.

Such conventional recycle, since it does not form a part of the instant invention, is not shown but is mentioned to distinguish it specifically from the liquid hydrocarbon recycle in line 7 which is admixed with the effluent from the hydrodealklylation reactor 5 contained in line 6. Obviously, the hydrocarbons which are recycled through the hydrodealkylation reactor 5 will require additional hydrogen in direct proportion to their quantity and in the same ratio as the fresh charge in order to provide for the hydrogen consumed by reaction and to maintain the same protection against coking. Accordingly, the composition of the hydrogen recycle stream must be controlled by the recycle of methane-free liquid hydrocarbons to the high pressure separator as will be described.

In a further embodiment of the invention, the liquid hydrocarbon recycle to line 7 may be supplied from any of the fractions obtained by the subsequent fractionation of the products contained in line 25 which may be recycled, through line 26, valve 18 into line 7. The source or composition of the liquid hydrocarbon recycle is not critical provided it is substantially methane-free.

The curves shown in FIGURES 2, 3 and 4 were obtained as follows:

A heavy gas oil having an 800° F. mid boiling point was charged to a commercial fluid catalytic cracking unit utilizing a silica-alumina catalyst. A light furnace oil product fraction was separated which had a boiling point of from 400° F. to 500° F. This light furnace oil contained approximately 70 mole percent aromatics and had a sulfur content of 0.19 weight percent. This light furnace oil cut was catalytically desulfurized utilizing a commercial cobalt-molybdate-alumina catalyst at a pressure of 630 p.s.i.g., a temperature of 735° F., a space velocity of 5 volumes per volume per hour and a hydrogen to hydrocarbon mole ratio of from 2:1 to 5:1. The desulfurized furnace oil product contained 21 mole percent paraffins, 8 mole percent cycloparaffins, 25 mole percent alkylbenzenes, 24 mole percent tetralins, and 22 mole percent naphthalenes. This material was charged to a pilot plant hydrodealkylation unit operating at a pressure of 3000 p.s.i.g., a maximum temperature of 1250° F., a reactor residence time of 15 seconds and a hydrogen to hydrocarbon mole ratio of 8:1. No catalyst was utilized in the reactor. Benzene and naphthalene were taken as products and a recycle consisting of about 75 percent by weight light materials, mostly toluene, and 25 percent by weight heavy materials, mostly methyl naphthalenes, were returned to the hydrodealkylation reactor. For convenience, the data obtained by this operation were converted to the basis of 1000 barrels per day of fresh catalytic furnace oil charged. On this basis, the total charge to the reactor was 3000 barrels per day since 2000 barrels per day were recycled to the reactor.

The 3000 barrels per day total charge to the reactor corresponded to 327 pound-moles per hour. The amount of hydrogen chemically consumed by this amount of charge to the reactor was 320 pound-moles per hour. The total products were 614 pound-moles per hour of which methane was 164 pound-moles per hour. As stated hereinbefore, a portion of this methane will be separated along with the hydrogen from the high pressure separator and will build up in concentration in the hydrogen recycle unless steps are taken to prevent such build up. When the hydrogen purity is maintained solely by purging gas from the hydrogen recycle stream and adding pure make-up hydrogen without utilizing any liquid hydrocarbon recycle to the high pressure separator, the curves of FIGURE 2 are obtained. These curves show the effect of the purge rate on the hydrogen recycle gas purity at various pressures from 500 p.s.i.a. to 3000 p.s.i.a. at 100° F.

As stated, it has been found that it is necessary to maintain a hydrogen purity of at least about 60 mole percent hydrogen in the recycle hydrogen stream in order to provide a sufficiently high hydrogen partial pressure such that the hydrodealkylation reaction will be substantially coke-free at convenient operating pressures.

Referring to FIGURE 2, to maintain 60 percent hydrogen purity, it is necessary to purge approximately 200 moles per hour of gas from the hydrogen recycle stream at 3000 p.s.i.a. Thus, the purge amounts to more than 60 percent of the chemical consumption. At lower pressures, i.e. 500 to 1000 p.s.i.a., which are utilized in the catalytic hydrodealkylation processes, hydrogen purities of above 80 percent are desired. If the curves for 500 and 1000 p.s.i.a. in FIGURE 2 are extended to the 80 mole percent purity level, it will be seen that the amount of purge required is between 900 and 1000 pound-moles per hour corresponding to three times the chemical consumption.

Figure 3:
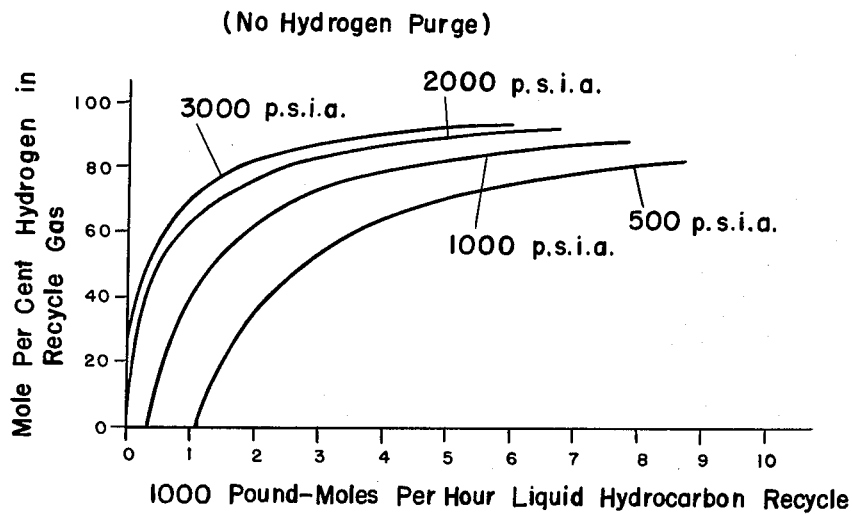
FIGURE 3 is a plot of the mole percent of hydrogen in the hydrogen recycle gas stream versus pound-moles per hour of liquid hydrocarbon recycle for various pressures in the high pressure separator when no hydrogen is purged from the hydrogen recycle stream.

FIGURE 3 represents the operation described for FIGURE 1 of the drawings wherein no gas is purged from the hydrogen recycle stream 3 but instead the purity of the hydrogen recycle stream is controlled by recycling substantially methane-free liquid hydrocarbons through line 7 for admixture with the effluent contained in line 6 which admixture is introduced through line 8 into the high pressure separator 9. In FIGURE 3 the relationship between the hydrogen purity in the recycle gas stream is shown as a function of the pound-moles per hour of hydrocarbon recycle to the high pressure separator at various pressures ranging from 500 to 3000 p.s.i.a. and a temperature of 100° F. in the high pressure separator.

It will be seen from FIGURE 3 that it is possible to control the purity of the hydrogen recycle stream at a predetermined level by controlling the quantity of liquid hydrocarbon recycle at any operating pressure in the high pressure separator. For example, if it is desired to maintain the hydrogen recycle stream at the 70 mole percent level with an operating pressure of 2000 p.s.i.a. in the high pressure separator, it will be necessary to recycle slightly less than 1500 pound-moles per hour of liquid hydrocarbon.

FIGURE 3 also shows that at lower operating pressures the liquid hydrocarbon recycle rate must be increased very markedly. Thus at the 80 mole percent hydrogen purity level and an operating pressure of 2000 p.s.i.a., 2500 pound-moles per hour recycle are required, at 1000 p.s.i.a., approximately 4000 pound-moles per hour recycle are required, but if the pressure is 500 p.s.i.a., the recycle rate increases to almost 8000 pound-moles per hour. Accordingly, the preferred minimum operating pressure in the high pressure separator is about 1000 p.s.i.a.

Figure 4:
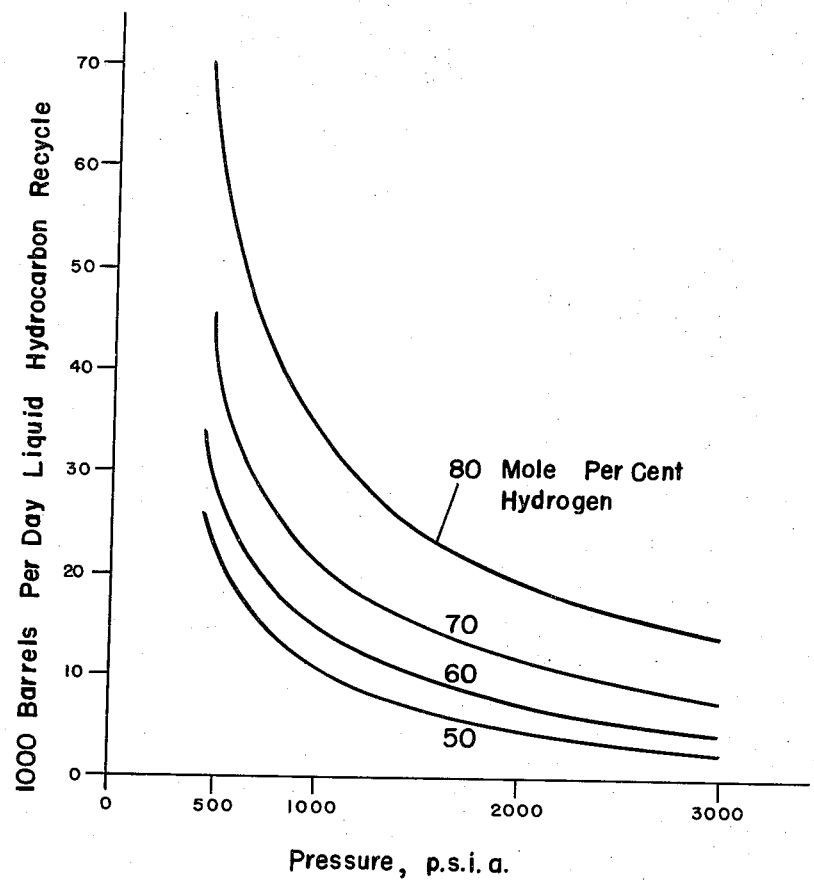
FIGURE 4 is a plot of barrels per day of liquid hydrocarbon recycle versus pressure in the high pressure separator for various levels of mole percent hydrogen in the recycle hydrogen stream when there is no hydrogen purge from the recycle hydrogen stream.

To illustrate the effect of pressure with greater clarity, the data of FIGURE 3 have been cross-plotted in FIGURE 4. In FIGURE 4 the quantity of liquid hydrocarbon recycle in barrels per day is plotted against the pressure in pounds per square inch absolute in the high pressure separator for various levels of hydrogen concentrations in the recycle gas, there being no gas purge from the hydrogen recycle stream. It will be seen that at about 1000 p.s.i.a., there is an inflection point showing that the quantity of recycle liquid required increases extremely rapidly at pressures below this limit.

The curves of FIGURE 3, as well as of FIGURE 4, demonstrate the operability of the invention and a specific embodiment of the invention. In order to provide curves which are applicable to a general hydrodealkylation process and independent of charge composition variables, conversion severities and similar process conditions, the curves of FIGURE 5 were developed. In this plot the mole percent hydrogen in the recycle gas stream is plotted as a function of the ratio of the pound-moles per hour of total product plus the pound-moles per hour of liquid hydrocarbon recycle to the pound-moles per hour of methane produced for various pressures and a temperature of 100° F. in the high pressure separator.

The pound-moles of total product is a quantity which may be measured directly in a hydrodealkylation process. This number, of course, is a function of the amount of charge to the reactor and the severity of the operation. The pound moles per hour of methane produced is also a number which can be determined for any hydrodealkylation process and is a function of the severity of the operation and the composition of the charge to the reactor. Irrespective of the process being employed, however, the pound-moles per hour of total product and pound moles per hour of methane produced can be determined. Thus, if the refiner has determined the pound-moles per hour of total product and the pound-moles per hour of methane produced for his process, by reference to FIGURE 5, the amount of liquid hydrocarbon recycle can be found which will produce any predetermined hydrogen purity in the recycle hydrogen stream for various pressures in the high pressure separator.

In obtaining the data for the curves of FIGURES 3 and 4 it was stated that 614 pound-moles per hour of total product were produced of which 164 pound-moles per hour were methane. If the high pressure separator was being operated at 2000 p.s.i.a. and a hydrogen purity of 70 mole percent in the recycle stream were desired the ratio of pound-moles per hour total product plus liquid hydrocarbon recycle to pound-moles per hour of methane produced would be 12.75. From the pound-moles per hour total product value of 614 and pound-moles per hour of methane produced value of 164, it is readily determined that 1,477 pound-moles per hour of liquid hydrocarbon recycle would be required. If reference is made to FIGURE 3, it will be seen that this value corresponds to the value of slightly less than 1500 pound-moles per hour determined from that curve directly as stated in the description of that curve for that example.

Figure 5:
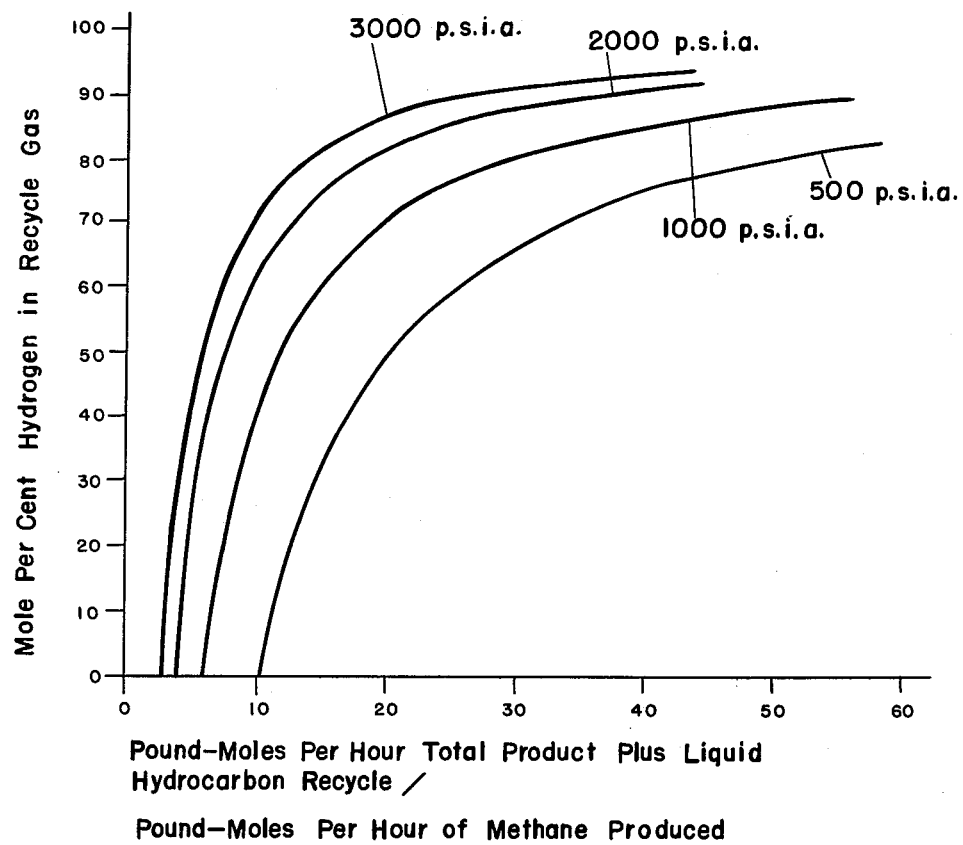
FIGURE 5 is a plot of the mole percent of hydrogen in the hydrogen recycle gas stream versus the ratio of pound-moles per hour of total product plus pound-moles per hour of liquid hydrocarbon recycle to pound-moles per hour of methane produced for various pressures with no purge; and, FIGURE 6 is a cross-plot of the data from FIGURE 5 with pressure as a variable.
Figure 6:
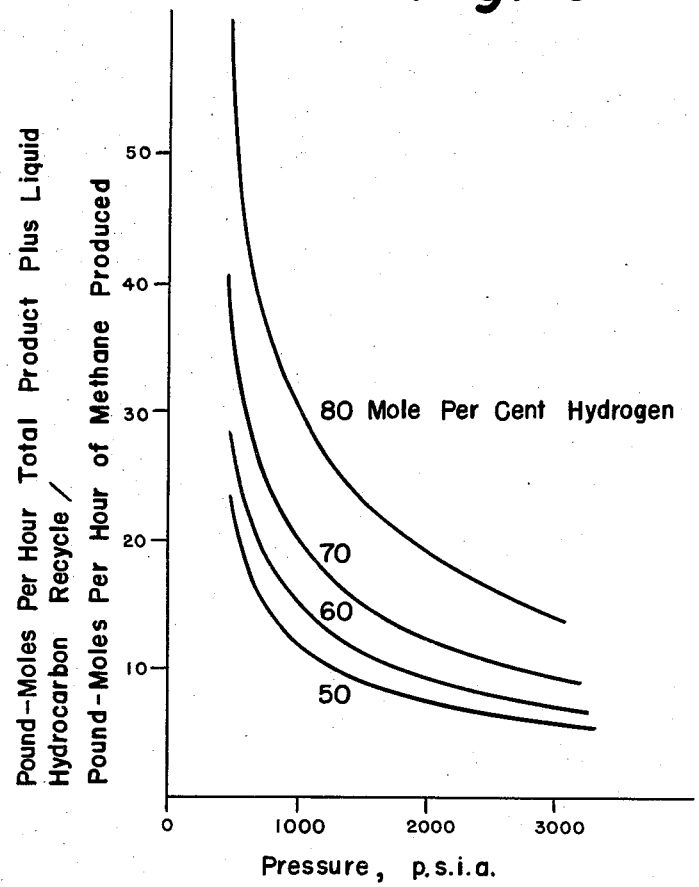

In order to demonstrate that it is desirable to have a pressure of at least 1000 p.s.i.a. in the high pressure separator in the general hydrodealkylation case, the data of FIGURE 5 were cross-plotted in FIGURE 6. It will be seen from FIGURE 6 that at pressures below about 1000 p.s.i.a. the ratios increase very rapidly and since the pound-moles of liquid hydrocarbon recycle are directly proportional to the value of the ratio, the liquid hydrocarbon recycle likewise must increase very markedly at pressures below about 1000 p.s.i.a.

I claim:

1. In a hydrodealkylation process wherein alkylated aromatic hydrocarbons are subjected in a conversion zone to conditions of elevated temperatures and pressures in the presence of hydrogen to produce an effluent stream containing dealkylated aromatics, methane and other normally gaseous saturated hydrocarbons together with unconverted hydrocarbons and unconsumed hydrogen and wherein at least a portion of the unconsumed hydrogen is separated from the effluent and recycled to the conversion zone, the improvement which comprises carrying out the separation of the unconsumed hydrogen from the liquid effluent hydrocarbons in a separation zone in the presence of a substantially methane-free liquid hydrocarbon recycle stream recycled to the separation zone, controlling the concentration of hydrogen in the recycle hydrogen stream to said conversion zone without purging said recycle hydrogen stream, by controlling the amount of said liquid hydrocarbon recycle stream in accordance with the amount of total product from the process, the amount of methane produced by the process and the pressure employed in said separation zone in accordance with FIGURE 5 of the drawings.

2. In a hydrodealkylation process wherein alkylated aromatic hydrocarbons are subjected in a conversion zone to conditions of elevated temperatures and pressures in the presence of hydrogen to produce an effluent stream containing dealkylated aromatics, methane and other normally gaseous saturated hydrocarbons, together with unconverted hydrocarbons and unconsumed hydrogen and wherein at least a portion of the unconsumed hydrogen is separated from the effluent and recycled to the conversion zone, the improvement which comprises carrying out the separation of the unconsumed hydrogen from the liquid effluent hydrocarbons in a separation zone at a pressure of at least about 1000 p.s.i.a. in the presence of a substantially methane-free liquid hydrocarbon recycle stream recycled to said separation zone, controlling the concentration of hydrogen in the recycle hydrogen stream to said conversion zone without purging said recycle hydrogen stream, by controlling the amount of said liquid hydrocarbon recycle stream in accordance with the amount of total product from the process, the amount of methane produced by the process and the pressure employed in said separation zone in accordance with FIGURE 5 of the drawings.

3. In a hydrodealkylation process wherein alkylated aromatic hydrocarbons are subjected in a conversion zone to conditions of elevated temperatures and pressures in the presence of hydrogen to produce an effluent stream containing dealkylated aromatics, methane and other normally gaseous saturated hydrocarbons together with unconverted hydrocarbons and unconsumed hydrogen and wherein at least a portion of the unconsumed hydrogen is separated from the effluent and recycled to the conversion zone, the improvement which comprises carrying out the separation of the unconsumed hydrogen from the liquid effluent hydrocarbons in a separation zone in the presence of a substantially methane-free liquid hydrocarbon recycle stream recycled to said separation zone, said liquid hydrocarbon recycle stream being a bottoms fraction obtained by the subsequent fractionation in a fractionation zone of a liquid hydrocarbon effluent from said separation zone, said fractionation in said fractionation zone being at a pressure lower than the pressure in said separation zone, controlling the concentration of hydrogen in the recycle hydrogen stream to said conversion zone without purging said recycle hydrogen stream, by controlling the amount of said liquid hydrocarbon recycle stream in accordance with the amount of total product from the process, the amount of methane produced by the process and the pressure employed in said separation zone in accordance with FIGURE 5 of the drawings.

4. In a hydrodealkylation process wherein alkylated aromatic hydrocarbons are subjected in a conversion zone to conditions of elevated temperatures and pressures in the presence of hydrogen to produce an effluent stream containing dealkylated aromatics, methane and other normally gaseous saturated hydrocarbons together with unconverted hydrocarbons and unconsumed hydrogen and wherein at least a portion of the unconsumed hydrogen is separated from the effluent and recycled to the conversion zone, the improvement which comprises carrying out the separation of the unconsumed hydrogen from the liquid effluent hydrocarbons in a first separation zone in the presence of a substantially methane-free liquid hydrocarbon recycle stream recycled to said first separation zone, said liquid hydrocarbon recycle stream being a bottoms fraction obtained by introducing a liquid hydrocarbon effluent from said first separation zone into a second separation zone operating at a lower pressure than said first separation zone, controlling the concentration of hydrogen in the recycle hydrogen stream to said conversion zone without purging said recycle hydrogen stream, by controlling the amount of said liquid hydrocarbon recycle stream in accordance with the amount of total product from the process, the amount of methane produced by the process and the pressure employed in said first separation zone in accordance with FIGURE 5 of the drawings.

5. In a hydrodealkylation process wherein alkylated aromatic hydrocarbons are subjected in a conversion zone to conditions of elevated temperatures and pressures in the presence of hydrogen to produce an effluent stream containing dealkylated aromatics, methane and other normally gaseous saturated hydrocarbons together with unconverted hydrocarbons and unconsumed hydrogen and wherein at least a portion of the unconsumed hydrogen is separated from the effluent and recycled to the conversion zone, the improvement which comprises carrying out the separation of the unconsumed hydrogen from the liquid effluent hydrocarbons in a first separation zone at a pressure of at least about 1000 p.s.i.a and in the presence of a substantially methane-free liquid hydrocarbon recycle stream recycled to said first separation zone, said liquid hydrocarbon recycle stream being a bottoms fraction obtained by introducing a liquid hydrocarbon effluent from said first separation zone into a second separation zone operating at a pressure of from atmospheric to 300 p.s.i.a., controlling the concentration of hydrogen in the recycle hydrogen stream to said conversion zone without purging said recycle hydrogen stream, by controlling the amount of said liquid hydrocarbon recycle stream in accordance with the amount of total product from the process, the amount of methane produced by the process and the pressure employed in said first separation zone in accordance with FIGURE 5 of the drawings.

References Cited in the file of this patent

UNITED STATES PATENTS

| | | |
|---|---|---|
| 2,335,531 | Praeger | Nov. 30, 1943 |
| 2,700,638 | Friedman | Jan. 25, 1955 |
| 2,780,661 | Hemminger et al. | Feb. 5, 1957 |
| 2,795,629 | Boedeker | June 11, 1957 |